Oct. 30, 1962 H. A. HEDLAND 3,060,958
FLOW REGULATORS
Filed Dec. 17, 1959
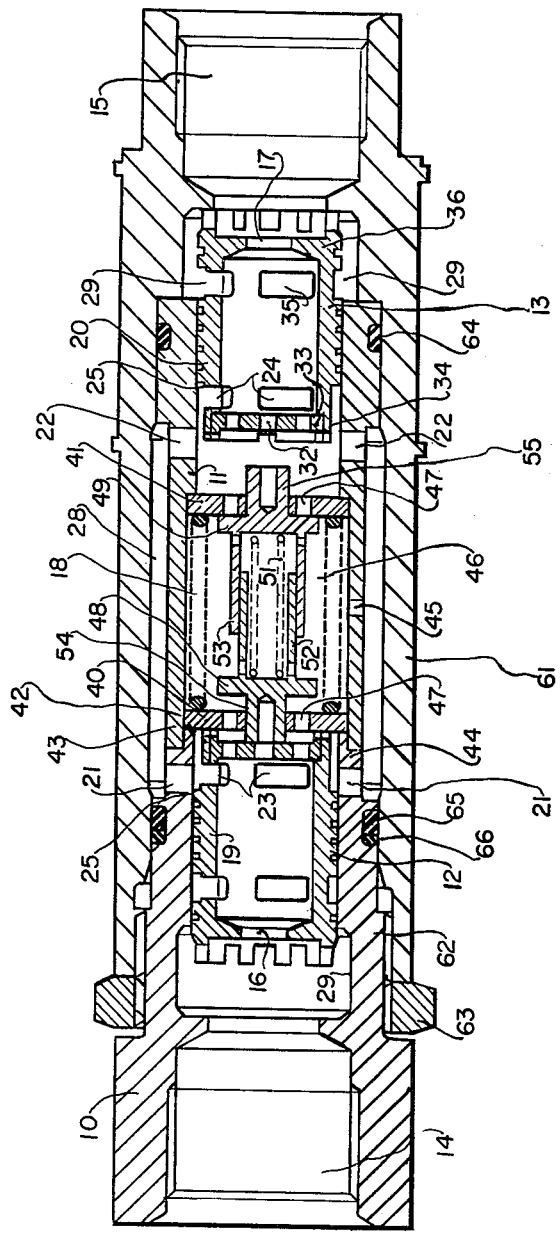
INVENTOR.
Harry A. Hedland
BY
Roland C. Rehm
Atty.

3,060,958
FLOW REGULATORS
Harry A. Hedland, Evanston, Ill., assignor to
William Waterman, Evanston, Ill.
Filed Dec. 17, 1959, Ser. No. 860,163
6 Claims. (Cl. 137—493.8)

This invention relates to fluid flow regulators, and among other objects aims to provide a simple and compact regulator adapted to regulate flow in two directions. Such a regulator is useful for example for single acting cylinders in which flow to and from the cylinder is regulated. It is particularly useful in aircraft where compactness and light weight are important. The inventive regulator combines a pair of co-axial regulator pistons each having a flow metering orifice, one for metering flow in one direction and the other for metering flow in the other direction. A single counterbalancing spring functions for both pistons. The idle piston is moved by reverse flow to a position where it does not interfere with or restrict such return flow.

The nature and further details of the invention may be readily understood by reference to an illustrative regulator embodying the invention and shown in the accompanying drawing.

In said drawing, the FIGURE is a longitudinal section of the illustrative regulator.

The illustrative regulator comprises an elongated hollow housing 10 having a longitudinal bore 11 in which are adapted to reciprocate a pair of regulator pistons 12 and 13. Adjacent the ends of the housing are inlets 14 and 15 which alternately act also as fluid outlets.

The pistons have relatively large metering orifices 16 and 17 through which flow alternately passes and which produce a small though sufficient pressure drop to actuate the regulator piston. The size of the metering orifices is determined by the desired rate of flow in the given direction. It is not necessary, therefore, that the regulated flow in one direction be the same as the flow in the opposite direction.

The pressure drop produced by flow is counterbalanced by a single spring 18 which in this instance, functions alternately for each regulator piston. The single spring does not interfere with different rates of flow in different directions. As stated above, the flow rate is regulated by the size of the metering orifice, and these may be widely different if desired.

Flow is throttled to produce the proper rate of flow by the piston skirts 19 and 20 in conjunction with the ports 21 and 22 respectively in the regulator housing. In this instance, the piston skirts are provided with ports 23 and 24 through which flow passes to ports 21 and 22 respectively, and it is the trailing edge 25 of the port which actually throttles flow as it passes to ports 21 and 22.

In the figure in the drawing, the regulator pistons are shown arranged for flow from left to right. As shown, flows enters inlet 14, passes through metering orifice 16 (producing a pressure drop to move piston 12 against the balancing force of spring 18) and leaves through ports 21 and 23 where it is throttled to produce the desired rate of flow. The regulated flow then travels through the annular passage 28 (which is amply large so as not to restrict flow) and as presently described, leaves through discharge outlet 15. As here shown, the flow re-enters the bore through ports 22, and since piston 13 is free to move to the right, it does so under force of flow to open by-pass passages 29 (formed by enlarging the bore adjacent each end) to flow, in addition to the orifice 17. Thus, flow past and through piston 13 is free and unrestricted. To effect unrestricted flow the end 31 of piston 13 (opposite orifice 17) is provided with one or more openings 32 which in this instance are in a separate disc 33 inserted in the end of the piston. Furthermore, the diameter of the piston is reduced as at 34 so that flow not only passes into the interior of the piston through openings 32 but around the reduced end 34 and through ports 24. By-pass ports 35 register with by-pass passages 29 when the piston 13 is moved to its extreme or idle position. Thus, there are amply large passages in addition to that through metering orifice 17 to insure that flow is unrestricted after it has passed the throttling ports.

In the event it is desired to make the disc 31 integral with the piston, then the opposite end 36 containing the metering orifice 17 is made separate and then attached appropriately to the piston.

Extension or expansion of spring 18 is limited by spring seats 40 and 41 whose outward travel is limited by shoulders 42 in the sleeve 43 forming the inner wall of annular passage 28.

To permit the use of a single spring and to prevent dash-pot action which might interfere with operation of the regulator, fluid is permitted freely to enter the spring space 46 through openings 47 and spring seats 40 and 41, but by-passing of flow around the throttling orifices and orifice 45 is prevented by check valves here shown in the form of discs 48 and 49 which alternately block the openings 47 in their respective seats 40 and 41. The check valves are urged to checking or blocking position by a light spring 51 which readily yields to permit opening of the check valve to flow attempting to enter the spring space 46. With flow from left to right as shown in the drawing, check valve 48 is open and check valve 49 is closed.

The check valves are provided with ported telescoping sleeves 52 and 53 to form an enclosure for spring 51.

From the opposite faces of the check valve project studs 54 and 55 which extend through the respective seats 40 and 41 sufficiently to be engaged by pistons 12 and 13 respectively, when the latter are in throttling position, thereby to unseat the check valve. In the drawing, flow being from left to right, check valve 48 is unseated by engagement of stud 54 with the end 31 of regulator piston 12. Check valve 49 is however seated, thus preventing by-passing of the throttling orifices.

When flow is from right to left the regulator pistons and check valves reverse their positions.

By-passing of a limited portion of the flow through by-pass orifice 45 advantageously improves regulation. As lateral or radial velocities past the trailing port edges 25 increase (converting pressure head into velocity head) there is a reduction in pressure on such trailing edges, thereby creating a supplemental force on the piston further to throttle flow. This causes the flow curve to droop from a straight horizontal line (representing uniform flow). In other words, as pressure differences increase the flow rate, instead of being uniform, tends to fall a little as these radial velocities through the throttling ports increase. By by-passing a portion of the flow through orifice 45 (thereby reducing the velocity through the throttling ports) this supplemental force is reduced and the aggregate flow held uniform.

To facilitate manufacture and assembly the housing 10 is made in two parts: the elongated main housing 61 (including the right hand inlet 15) which is adapted to receive most of the parts from its open left hand end, and the retainer end 62 (including inlet 14) which telescopes and threads into housing 61 and has the extension of bore 11 in which piston 12 operates. End 62 abuts sleeve 43 and is rabbeted at 44 to provide the shoulder 42 against which seat 40 rests. End 62 is screwed into housing 61 until the assembled parts are held tightly together. A locking ring nut 63 holds the parts against loosening. Sealing rings in the form of O-rings 64 and 65 seal the unit against leakage. Preferably a back-up ring 66 made of Teflon backs up the O-ring to prevent its being extruded by internal fluid pressure.

The illustrative regulator provides a simple and compact unit for regulating flow in two directions.

Obviously the invention is not limited to the details of the illustrative regulator since these may be variously modified. Moreover, it is not indispensable that all features of the invention be used conjointly, since various features may be used to advantage in different combinations and sub-combinations.

Having described my invention, I claim:

1. A flow regulator for regulating flow in two directions comprising in combination a regulator housing having a longitudinal cylindrical flow chamber and inlets at each end alternating as outlets for reverse flow, a pair of spaced opposed regulator pistons slidable in said chamber, each adapted to be operatively engaged by the flow entering the up-stream inlet and each having in its up-stream end a metering orifice through which flow passes to produce a pressure drop for actuating the piston, a spring in the space between and operatively engaging said pistons to counterbalance the force of fluid flow on the up-stream piston, a port in each piston down-stream of its orifice, outlets in said chamber variably registering with said ports respectively, the latter being adapted on movement of the piston to throttle flow from the piston orifice through said outlet, a passage in said housing for conducting throttled flow to the opposite piston, said flow being adapted to move said opposite piston down-stream, a by-pass orifice in each opposite piston, and by-pass passages in said housing, said by-pass orifices being adapted when the said opposite piston is moved down-stream to register with said by-pass passages to by-pass flow around the metering orifice of said opposite piston.

2. A two-way flow regulator for regulating flow in both directions in a line comprising in combination a regulator housing a cylindrical chamber therein and flow openings at each end adapted to be connected in the line whereby flow will enter the up-stream opening and leave by the down-stream opening, a pair of spaced opposed regulator pistons in said chamber in the path of flow and each being adapted to be moved in the direction of flow, a spring in the space between and operatively engaging said pistons adapted to resist movement of the up-stream piston, each piston having at its end adjacent the opening through which flow enters the housing a metering orifice through which flow passes to produce a pressure drop to deflect said spring, the downstream piston being moved by flow to idle position, by-pass passages in said housing for each piston adjacent the down-stream end of the housing, by-pass outlet ports in said pistons adapted to register with the by-pass passages for that piston when the down-stream piston is moved by flow to said idle position, thereby to supplement the flow through the down-stream metering orifice, each piston having a throttling port adapted to communicate with its outlet port when the up-stream piston is moved by flow against the resistance of said spring.

3. A two-way flow regulator for regulating flow in both directions in a line comprising in combination a regulator housing a cylindrical chamber therein and flow openings at each end adapted to be connected in the line whereby flow will enter the up-stream opening and leave by the down-stream opening, a pair of spaced opposed regulator pistons in said chamber in the path of flow and being adapted to be moved in the direction of flow, a spring in the space between and operatively engaging said pistons adapted to resist movement of the up-stream piston in response to flow, each piston having at its end adjacent the opening through which flow enters the housing a metering orifice through which flow passes to produce a pressure drop to deflect said spring, outlet ports in said housing for each piston, each piston having a throttling port adapted to communicate with its outlet port when said piston is moved by flow against the force of said spring, and by-pass ports for each piston, by-pass passages in said housing for each said by-pass port, said ports being normally closed when the piston is in regulating position but registering with the respective by-pass passage upon movement of the down-stream piston in response to flow from said up-stream piston to by-pass flow around said down-stream piston.

4. In a two-way flow regulator for regulating flow in both directions in a line the combination comprising a regulator housing a cylindrical chamber therein and flow openings at each end adapted to be connected in the line whereby flow will enter the up-stream opening and leave by the down-stream opening, a pair of spaced opposed regulator pistons in said chamber in the path of flow and being adapted to be moved in the direction of flow, a spring in the space between and operatively engaging the up-stream piston to resist movement of the up-stream piston in response to flow, stops in said housing adjacent each end of the spring to limit its expanding movement thereby to relieve the downstream piston of spring pressure, each piston having at its end adjacent the opening through which flow enters the housing a metering orifice through which flow passes to produce a pressure drop to deflect said spring, means effective on movement of the up-stream piston in response to flow through the up-stream metering orifice to throttle and regulate flow through the regulator, check valves at each end of said spring, each check valve when up-stream opening to permit fluid to enter the spring space but the down-stream check valve being closed by fluid pressure to prevent flow from passing to the down-stream piston.

5. A two-way flow regulator for regulating flow in both directions in a line comprising in combination a regulator housing a cylindrical chamber therein and flow openings at each end adapted to be connected in the line whereby flow will enter the up-stream opening and leave by the down-stream opening, a pair of spaced opposed regulator pistons in said chamber in the path of flow and being adapted to be moved in the direction of flow, a spring in the space between said pistons adapted operatively to engage and resist movement of the up-stream piston, stops in said housing adjacent each end of the spring to limit its expanding movement thereby to relieve the down-stream piston of spring pressure, each piston having at its end adjacent the opening through which flow enters the housing a metering orifice through which flow passes to produce a pressure drop to deflect said spring, check valves at each end of said spring, each check valve when up-stream opening to permit fluid to enter the spring space but the down-stream check valve being closed by fluid pressure to prevent flow from passing to the down-stream piston, each piston having a throttling port for flow entering into its metering orifice, said housing having a passage to conduct said flow around the spring space to the down-stream piston, by-pass passages in said housing, each piston having therein a by-pass opening adapted to register respectively with a by-pass passage when the down-stream piston is moved by said flow around the spring space to permit flow to by-pass the metering orifice of said down-stream piston.

6. In a two-way flow regulator for regulating flow in both directions in a line, the combination comprising a housing having a cylindrical chamber therein and flow openings at each end adapted to be connected in the line whereby flow will enter the up-stream opening of said chamber and leave by the down-stream opening, a pair of spaced opposed regulator pistons in said chamber in the path of flow, the pistons each having in an end a metering orifice through which flow is adapted to pass when the piston is up-stream to produce a pressure drop to move said piston in the direction of flow through said chamber, a spring in the space between the pistons and adapted operatively to engage the up-stream piston to resist movement of the up-stream piston in response to said pressure drop, throttling ports variably covered by the movement of said up-stream piston in response to said pressure drop to regulate flow, the down-stream piston being moved by flow to idle position, a by-pass passage in the housing for each piston, a by-pass port in each piston adapted to register its by-pass port with its by-pass passage in said idle position when the piston becomes a down-stream piston to permit flow to by-pass the metering orifice in the down-stream piston.

References Cited in the file of this patent

UNITED STATES PATENTS

| | | |
|---|---|---|
| 2,803,312 | Lucien | Aug. 20, 1957 |
| 2,845,086 | Waterman et al. | July 29, 1958 |